(12) United States Patent
Takahashi et al.

(10) Patent No.: US 11,724,694 B2
(45) Date of Patent: Aug. 15, 2023

(54) TRAVELING ASSISTANCE APPARATUS

(71) Applicant: DENSO CORPORATION, Kariya (JP)

(72) Inventors: Toru Takahashi, Kariya (JP); Yosuke Ito, Kariya (JP); Kei Kamiya, Kariya (JP); Ryo Takaki, Kariya (JP); Shogo Matsunaga, Kariya (JP); Takaharu Oguri, Kariya (JP); Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 335 days.

(21) Appl. No.: 16/952,608

(22) Filed: Nov. 19, 2020

(65) Prior Publication Data

US 2021/0070287 A1    Mar. 11, 2021

Related U.S. Application Data

(63) Continuation of application No. PCT/JP2019/019130, filed on May 14, 2019.

(30) Foreign Application Priority Data

May 21, 2018 (JP) .................................. 2018-097455

(51) Int. Cl.
*G08G 1/16* (2006.01)
*B60W 30/095* (2012.01)
*B60W 50/00* (2006.01)

(52) U.S. Cl.
CPC .... *B60W 30/0956* (2013.01); *B60W 50/0098* (2013.01); *B60W 2050/0071* (2013.01); *B60W 2540/18* (2013.01)

(58) Field of Classification Search
CPC ......... B60W 30/0956; B60W 50/0098; B60W 2050/0071; B60W 2540/18;
(Continued)

(56) References Cited

U.S. PATENT DOCUMENTS 9,308,914 B1 4/2016 Sun et al.
10,829,128 B2 * 11/2020 Hoshikawa ....... B60W 50/0097
(Continued)

FOREIGN PATENT DOCUMENTS

DE    102015010273 A1 *  3/2016 ............... B60T 7/12
JP       2007099237 A  *  4/2007
(Continued)

*Primary Examiner* — Donald J Wallace
*Assistant Examiner* — Daniel M. Robert
(74) *Attorney, Agent, or Firm* — Maschoff Brennan

(57) ABSTRACT

A traveling assistance apparatus controls a safety apparatus for avoiding collision between an own vehicle and an object, based on detection information from an object detection apparatus. The assistance apparatus calculates a predicted time to collision of a target object and the own vehicle, and operates the safety apparatus in response to the predicted time to collision being equal to or less than a predetermined operation timing. In response to a steering operation by a driver for collision avoidance of the own vehicle being performed, the assistance apparatus performs operation-stop in which operation of the safety apparatus is stopped or operation-delay in which the operation timing is delayed. The assistance apparatus suppresses the operation-stop or the operation-delay in response to a target object serving as a collision avoidance target being recognized in a path of the own vehicle after the steering operation by the driver, based on the detection information.

15 Claims, 9 Drawing Sheets

(58) Field of Classification Search
CPC ......... B60W 2050/0062; B60R 21/013; B60R 21/0134; G08G 1/16
See application file for complete search history.

(56) References Cited

U.S. PATENT DOCUMENTS

| | | | |
|---|---|---|---|
| 2003/0014162 A1 | 1/2003 | Sadano | |
| 2012/0265418 A1* | 10/2012 | Foerster | B60W 10/06 701/70 |
| 2015/0025784 A1* | 1/2015 | Kastner | B60W 30/0956 701/119 |
| 2015/0291216 A1* | 10/2015 | Sato | B60W 30/0956 701/41 |
| 2016/0207530 A1* | 7/2016 | Stanek | B60W 10/184 |
| 2016/0280235 A1 | 9/2016 | Sugaiwa et al. | |
| 2018/0118203 A1* | 5/2018 | Minemura | G08G 1/166 |
| 2018/0118205 A1 | 5/2018 | Minemura et al. | |
| 2019/0001970 A1 | 1/2019 | Takahashi et al. | |
| 2019/0031189 A1* | 1/2019 | Patana | B60W 10/20 |
| 2019/0291729 A1* | 9/2019 | Kamiya | B60W 30/09 |
| 2020/0262421 A1* | 8/2020 | Ito | F02D 29/02 |

FOREIGN PATENT DOCUMENTS

| | | | |
|---|---|---|---|
| JP | 2017056795 A | * | 3/2017 |
| JP | 2018049445 A | * | 3/2018 |

* cited by examiner

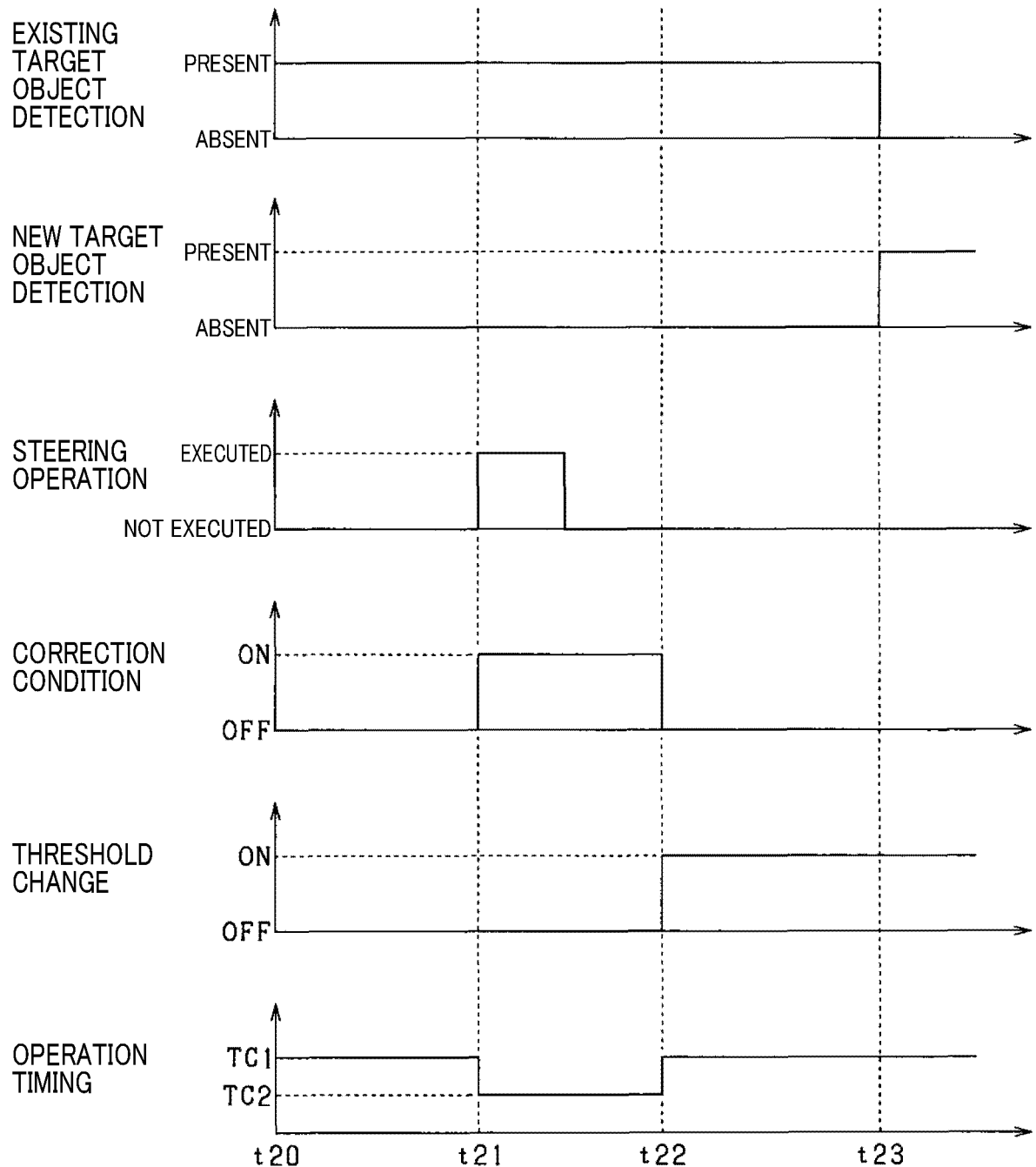

TRAVELING ASSISTANCE APPARATUS

CROSS-REFERENCE TO RELATED APPLICATIONS

The present application is a continuation application of International Application No. PCT/JP2019/019130, filed May 14, 2019, which claims priority to Japanese Patent Application No. 2018-097455, filed May 21, 2018. The contents of these applications are incorporated herein by reference in their entirety.

BACKGROUND

Technical Field

The present disclosure relates to a traveling assistance apparatus that is capable of performing collision avoidance control of a vehicle.

Related Art

A traveling assistance apparatus that includes a pre-crash safety (PCS) system that detects an object in a periphery of an own vehicle, and avoids or mitigates a collision of the own vehicle by operating a safety apparatus as required is known. In such a traveling assistance apparatus, a technology in which operation of the PCS system is delayed (modified) or stopped (overrode) when a collision avoidance operation by a driver is performed is known.

SUMMARY

The present disclosure provides a traveling assistance apparatus that controls a safety apparatus for avoiding a collision between an own vehicle and an object in a periphery of the own vehicle, based detection information from an object detection apparatus. The traveling assistance apparatus calculates a predicted time to collision of a target object and the own vehicle, and operates the safety apparatus in response to the predicted time to collision being equal to or less than a predetermined operation timing. In response to a steering operation by a driver for collision avoidance of the own vehicle being performed, the traveling assistance apparatus performs operation-stop in which operation of the safety apparatus is stopped or operation-delay in which the operation timing is delayed. The traveling assistance apparatus suppresses the operation-stop or the operation-delay in response to a target object that serves as a collision avoidance target being recognized in a path of the own vehicle after the steering operation by the driver, based on the detection information.

BRIEF DESCRIPTION OF THE DRAWINGS

In the accompanying drawings:

FIG. 8 is a timing chart of the collision avoidance process according to the second embodiment;

DESCRIPTION OF THE EMBODIMENTS

Figure 1:
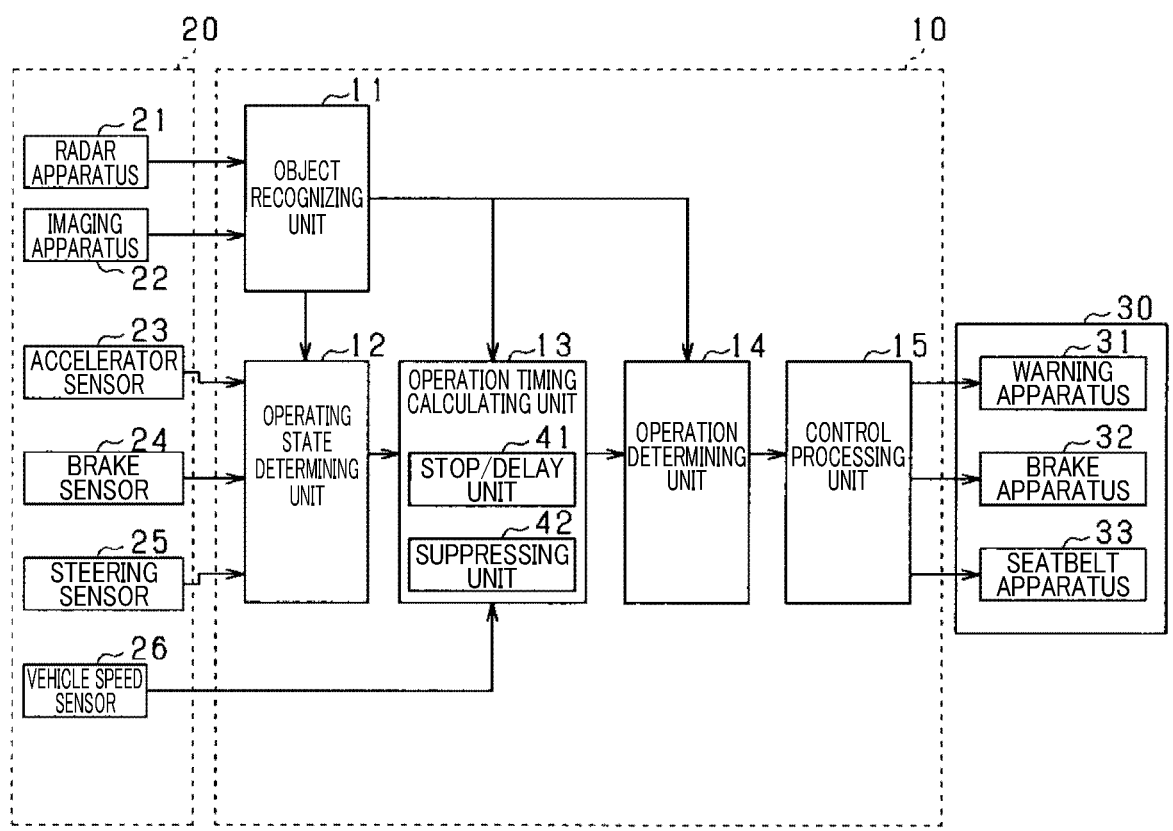
FIG. 1 is a diagram of a traveling assistance system according to an embodiment.

For example, in JP-A-2016-190613, when the collision avoidance operation by the driver is performed, a timing at which the safety apparatus is operated is delayed. As a result, unnecessary operation of the safety apparatus is prevented.

A risk of collision may not be sufficiently reduced even by the driver performing the collision avoidance operation. For example, the risk of collision may not be sufficiently reduced in cases in which, when the driver performs a steering operation to avoid a collision with a leading vehicle, the leading vehicle is steered in a same direction as the own vehicle. In such cases, when the operation of the PCS system is in the delayed or stopped state as a result of the collision avoidance operation by the driver being performed, avoidance or mitigation of the collision becomes insufficient. Decrease in collision safety becomes a concern.

It is thus desired to provide a traveling assistance apparatus that is capable of more appropriately operating a safety apparatus and ensuring higher collision safety, while taking into consideration operability and comfort of a driver.

An exemplary embodiment of the present disclosure provides a traveling assistance apparatus that, based detection information from an object detection apparatus that detects an object in a periphery of an own vehicle, controls a safety apparatus for avoiding a collision between the own vehicle and the object. The traveling assistance apparatus includes: an operation determining unit that calculates a predicted time to collision of a target object and the own vehicle, and operates the safety apparatus in response to the predicted time to collision being equal to or less than a predetermined operation timing; a stop/delay unit that performs operation-stop in which operation of the safety apparatus is stopped or operation-delay in which the operation timing is delayed, in response to a steering operation by a driver for collision avoidance of the own vehicle being performed; and a suppressing unit that suppresses the operation-stop or the operation-delay in response to a target object that serves as a collision avoidance target being recognized in a path of the own vehicle after the steering operation by the driver, based on the detection information.

As a result of the present disclosure, because operation-stop or operation-delay of the safety apparatus is performed by the stop/delay unit in response to the steering operation by the driver for collision avoidance of the own vehicle being performed, unnecessary operation of the safety apparatus can be prevented. Furthermore, when a target object that serves as a collision avoidance target is recognized in the path of the own vehicle after the steering operation by the driver based on the detection information from the object detection apparatus, the suppressing unit suppresses execution of operation-stop or operation-delay by the stop/delay unit.

Therefore, when a risk of collision is not reduced even by the driver performing the steering operation, the safety apparatus can be appropriately operated. The operation of the safety apparatus can be stopped or delayed when a collision can be avoided by the steering operation by the driver. Meanwhile, the safety apparatus can be operated when the collision cannot be avoided even by the driver's steering operation. Consequently, higher collision safety can be ensured while taking into consideration operability and comfort for the driver.

First Embodiment

FIG. 1 shows a traveling assistance system 1 according to a present embodiment. The traveling assistance system 1 includes an electronic control unit (ECU) 10, sensors 20, and a safety apparatus 30. The ECU 10 is mounted in a vehicle. The ECU 10 is a traveling assistance apparatus that performs traveling assistance for a vehicle. The ECU 10 provides a function as a PCS system that, based on detection information regarding an object that is present in the periphery of an own vehicle, performs control to avoid a collision with the object or mitigate collision damage. Detection information from the sensors 20 is inputted to the ECU 10. The ECU 10 controls the safety apparatus 30 based on the inputted detection information.

The sensors 20 include a radar apparatus 21, an imaging apparatus 22, an accelerator sensor 23, a brake sensor 24, a steering sensor 25, and a vehicle speed sensor 26. The radar apparatus 21 and the imaging apparatus 22 function as object detection apparatuses that detect an object in the periphery of the own vehicle.

For example, the radar apparatus 21 is a publicly known millimeter-wave radar in which a high-frequency signal in a millimeter-wave band serves a transmission wave. The radar apparatus 21 is provided in a front end portion of the own vehicle. With an area within a predetermined detection angle set as a detection area in which an object can be detected, the radar apparatus 21 detects a position of an object in the detection area.

Specifically, the radar apparatus 21 transmits a probe wave at a predetermined cycle and receives a reflected wave by a plurality of antennas. The radar apparatus 21 calculates a distance to the object based on a transmission time of the probe wave and a reception time of the reflected wave. In addition, the radar apparatus 21 calculates a relative speed based on a frequency of the reflected wave reflected by the object that is changed by the Doppler effect. Furthermore, the radar apparatus 21 calculates an orientation of the object based on a phase difference between the reflected waves received by the plurality of antennas.

If the position and the orientation of the object is calculated, a relative position of the object in relation to the own vehicle can be identified. The radar apparatus 21 performs the transmission of the probe wave, the reception of the reflected wave, and the calculation of a reflection position and the relative speed at each predetermined cycle, and transmits the calculated reflection position and relative speed to the ECU 10

For example, the imaging apparatus 22 is a single-lens imaging apparatus, such as a charge-coupled device (CCD) camera, a complementary metal-oxide semiconductor (CMOS) image sensor, or a near-infrared camera. The imaging apparatus 22 is attached at a predetermined height in a center of the vehicle in a vehicle-width direction. The imaging apparatus 22 captures an image of an area ahead of the vehicle over a predetermined angular range, from a bird's-eye viewpoint. The imaging apparatus 22 extracts a feature point that indicates a presence of an object in the captured image. Specifically, the imaging apparatus 22 extracts edge points based on luminance information of the captured image, and performs a Hough transform on the extracted edge points.

For example, in the Hough transform, a point on a straight line in which a plurality of edge points are continuously arrayed or a point at which straight lines intersect each other is extracted as the feature point. The imaging apparatus 22 performs imaging and extraction of feature points at each control cycle that is identical to or differs from that of the radar apparatus 21, and transmits the extraction result of the feature points to the ECU 10.

The accelerator sensor 23 is provided in an accelerator pedal. The accelerator sensor 23 detects execution/non-execution of an operation of the accelerator pedal by the driver and an operation amount thereof.

The brake sensor 24 is provided in a brake pedal. The brake sensor 24 detects execution/non-execution of an operation of the brake pedal by the driver and an operation amount thereof.

The steering sensor 25 is provided in a steering. The steering sensor 25 detects a direction of a steering operation by the driver and an operation amount thereof.

The vehicle speed sensor 26 is provided in a rotation shaft that transmits motive power to a wheel of the own vehicle. The vehicle speed sensor 26 determines a speed of the own vehicle based on a rotation frequency of the rotation shaft.

The safety apparatus 30 includes a warning apparatus 31, a brake apparatus 32, and a seatbelt apparatus 33, The warning apparatus 31, the brake apparatus 32, and the seatbelt apparatus 33 are driven based on control commands from the ECU 10.

For example, the warning apparatus 31 is a speaker or a display that is set inside a vehicle cabin of the own vehicle. The warning apparatus 31 outputs a warning sound, a warning message, or the like based on the control command from the ECU 10. The warning apparatus 31 thereby notifies the driver of a risk of a collision with an object.

The brake apparatus 32 is a braking apparatus that brakes the own vehicle. According to the present embodiment, the ECU 10 provides a brake assist function and an automatic brake function as brake functions for avoidance of a collision with an object or mitigation of collision damage. The brake assist function increases and supplements braking force from a brake operation by the driver. The automatic brake function performs automatic braking when a brake operation by the driver is not performed. The brake apparatus 32 performs brake control through these functions based on the control command from the ECU 10.

The seatbelt apparatus 33 includes a pretensioner mechanism that pulls a seatbelt that is provided for each seat in the own vehicle. The seatbelt apparatus 33 performs pulling of the seatbelt and a preliminary operation thereof based on the control command from the ECU 10. As a result of the pretensioner mechanism, the seatbelt is pulled and slack is eliminated. A passenger, such as the driver, is thereby fixed to the seat and protected.

The ECU 10 includes an object recognizing unit 11, an operating state determining unit 12, an operation timing calculating unit 13, an operation determining unit 14, and a control processing unit 15. The operation timing calculating unit 13 includes a stop/delay unit 41 and a suppressing unit 42. The ECU 10 includes a central processing unit (CPU), a read-only memory (ROM), a random access memory (RAM), an input/output (I/O), and the like, and actualizes functions of these units as a result of the CPU running a program that is installed in the ROM. As a result, the ECU 10 functions as a traveling assistance apparatus that controls the safety apparatus for avoiding a collision between the own vehicle and an object, based on the detection information of the object detection apparatus, such as the radar apparatus 21 and the imaging apparatus 22.

The object recognizing unit 11 acquires the detection information regarding an object from the radar apparatus 21 and the imaging apparatus 22. The object recognizing unit 11 uses position information regarding an object that is acquired from the radar apparatus 21 and the feature point that is acquired from the imaging apparatus 22, and recognizes that an object is present at that position. In addition, the object recognizing unit 11 associates a relative position and a relative speed in relation to the own vehicle, for each object. Based on the associated relative position and relative speed, the object recognizing unit 11 calculates a lateral speed that is the relative speed in a direction that is orthogonal to an advancing direction of the own vehicle and a vertical speed that is the relative speed in the advancing direction of the own vehicle.

The object recognizing unit 11 may be configured to set a predetermined area in the periphery of the own vehicle as a detection area, and recognize an object that has been detected in the detection area as a target object that is a target for collision avoidance. Furthermore, a danger area may be set in a predetermined area that includes at least an area to a side of the own vehicle. In this case, the object recognizing unit 11 may be configured to be capable of recognizing whether the target object has been detected in the danger area. The danger area is preferably set in the detection area and set to an area that is narrower than the detection area.

The operating state determining unit 12 determines whether the collision avoidance operation by the driver for avoiding a collision between the object recognized by the object recognizing unit 11 and the own vehicle has been started. Specifically, the operating state determining unit 12 determines the start of the collision avoidance operation by the driver for avoiding a collision between the object and the own vehicle based on an instantaneous indicator that is an instantaneous value of an indicator that is related to the steering of the own vehicle.

According to the present embodiment, a determination condition related to the steering operation is included, and whether the collision avoidance operation by the driver being started has been determined based on a steering angle detected by the steering sensor 25. Here, the condition for determining the start of the collision avoidance operation may include a determination condition that is related to the accelerator operation or the brake operation by the driver, in addition to the steering operation.

The operation timing calculating unit 13 sets an operation timing of the safety apparatus 30 as an assistance start timing at which driving assistance for avoiding a collision between the object recognized by the object recognizing unit 11 and the own vehicle, or for mitigating collision damage has been started.

Figure 2A:
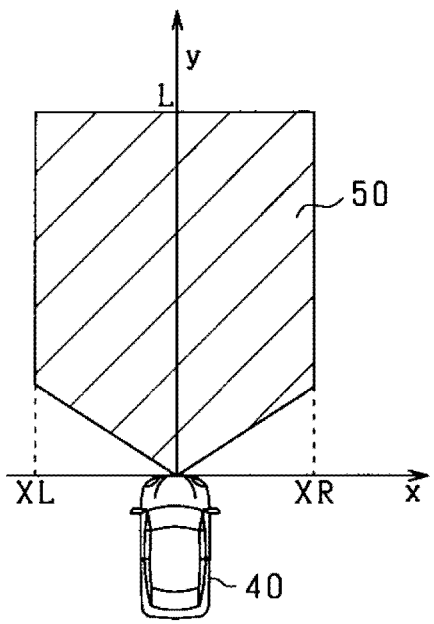
FIG. 2A is a conceptual diagram of an ordinary detection area.

In addition, the operation timing calculating unit 13 calculates a depth position L of an operation area 50 shown in FIG. 2A, based on the set operation timing and the relative speed of the object and the own vehicle 40. Furthermore, the operation timing calculating unit 13 may be configured to set a right-side restriction value XR and a left-side restriction value XL as restriction values in the lateral direction of an object that serving as a target of operation of the safety apparatus 30. However, this is not limited thereto. For example, the operation determining unit 14 may be configured to set the right-side restriction value XR and the left-side restriction value XL.

As shown in FIG. 2A, an area surrounded by the right-side restriction value XR, the left-side restriction value XL, and the depth position L is set as the operation area 50. The right-side restriction value XR and the left-side restriction value XL may be prescribed in advance based on a type of object. For example, when the object is a leading vehicle, a likelihood of sudden movement in the lateral direction occurring is small. Therefore, the right-side restriction value XR, the left-side restriction value XL may be set to relatively small values. Meanwhile, when the object is a pedestrian, sudden movement in the lateral direction may occur. Therefore, the right-side restriction value XR and the left-side restriction value XL may be set to relatively large values.

The operation timing calculating unit 13 calculates the operation timing based on a reference timing TC1 that is stored in advance in the ECU 10. The reference timing TC1 is set in advance based on the content of driving assistance, for each safety apparatus 30.

Specifically, the ECU 10 provides a function for performing first control in which the warning apparatus 31 is operated, second control in which the brake operation by the driver is supplemented through the brake assist function, and third control in which automatic braking of the own vehicle is performed through the automatic brake function. Among the foregoing, the operation timing of the warning apparatus 31 that is the first control is set to an earliest timing. The operation timing of the automatic brake function that is the third control is set to a latest timing.

The operation timing calculating unit 13 includes the stop/delay unit 41 and the suppressing unit 42. Through the stop/delay unit 41 and the suppressing unit 42, the reference timing TC1 is corrected as required based on the determination regarding the collision avoidance operation by the operating state determining unit 12, and set as the operation timing.

The stop/delay unit 41 performs operation-stop or operation-delay of the safety apparatus 30 in response to the collision avoidance operation by the driver for collision avoidance of the own vehicle being performed.

Specifically, operation-stop is a process for prohibiting or terminating the operation of the safety apparatus 30. Operation-stop may be referred to as "override," which refers to a process for cancelling the operation of the safety apparatus 30. Specifically, operation-delay is a process for delaying the operation timing of the safety apparatus 30. Operation-delay may be referred to as "modify," which refers to a process for making the safety apparatus 30 less likely to operate.

The stop/delay unit 41 may be configured to perform only either of operation-stop and operation-delay. Alternatively, the stop/delay unit 41 may be configured to perform both. When operation-stop and operation-delay are both performed, the stop/delay unit 41 may set differing execution conditions for operation-stop and operation-delay.

For example, the stop/delay unit 41 may be configured to perform operation-delay when the angle of the steering operation by the driver is small, and perform operation-stop when the angle of the steering operation by the driver is large. If the safety apparatus 30 is operated when the driver is performing a collision avoidance operation such as the steering operation to avoid a collision with an object that is present ahead of the own vehicle, the driver may experience annoyance towards the operation of the safety apparatus 30.

As a result of the stop/delay unit 41, when the operation for collision avoidance is being performed by the driver, operation-stop of the safety apparatus 30 can be performed or the operation timing of the safety apparatus 30 can be delayed compared to that when the collision avoidance operation is not being performed. Consequently, operability and comfort can be ensured for the driver.

The stop/delay unit 41 is configured to perform operation-stop or operation-delay of the safety apparatus 30 based on at least the steering operation by the driver. For example, the configuration may be such that, when the steering angle acquired from the steering sensor 25 exceeds a threshold X, the steering operation by the driver is determined to be performed, and operation-stop or operation-delay of the safety apparatus 30 by the stop/delay unit 41 is performed. The stop/delay unit 41 may be configured to perform operation-stop or operation-delay based on another collision avoidance operation such as the brake operation, in addition to the steering operation.

When the operating state determining unit 12 determines that the collision avoidance operation has not been started, operation-stop or operation-delay of the safety apparatus 30 by the stop/delay unit 41 is not performed. In this case, the operation timing calculating unit 13 sets the reference timing TC1 that prescribes the operation timing of the safety apparatus 30 in advance. That is, as shown in FIG. 2A, the area that is surrounded by the right-side restriction value XR, the left-side restriction value XL, and the depth position L is set as the operation area 50.

When the operating state determining unit 12 determines that the collision avoidance operation has been started, the stop/delay unit 41 performs operation-stop or operation-delay of the safety apparatus 30. As a specific example, when a description is given with reference to a case in which the stop/delay unit 41 performs operation-delay, the operation timing of the safety apparatus 30 is corrected to a timing (referred to, hereafter, as a "delay timing TC2") that is later than the reference timing TC1.

Figure 2B:
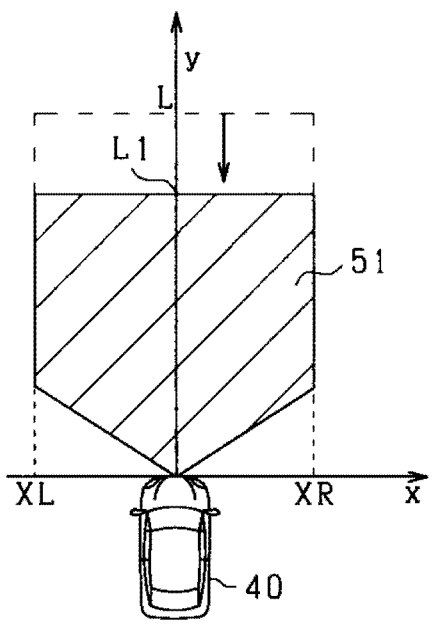
FIG. 2B is a conceptual diagram of a detection area when operation delay is performed.

When delay of the operation timing is performed, as shown in FIG. 2B, the depth position L in FIG. 2A is corrected to a depth position L1 that is closer to the own vehicle 40. That is, the operation area 50 in FIG. 2A is corrected to an operation area 51 that is surrounded by the right-side restriction value XR, the left-side restriction value XL, and the depth position L1. As a result, when the driver performs the collision avoidance operation, the safety apparatus 30 operates at the timing at which the own vehicle is closer to the target object.

The stop/delay unit 41 may be configured to continue operation-stop or operation-delay during a period from a timing at which the collision avoidance operation is determined to be started until an elapse of a predetermined set amount of time. For example, the configuration may be such that, when the collision avoidance operation is determined to be started and the stop/delay unit 41 performs operation-delay, the operation timing is held at the delay timing until the predetermined set amount of time elapses. As a result of a configuration such as this, when the collision avoidance operation by the driver is temporarily interrupted after the collision avoidance operation has been started, the delay in the operation timing being dismissed in accompaniment with this temporary interruption can be prevented.

When the target object is recognized in the danger area, the stop/delay unit 41 may be configured such that operation-stop or operation-delay of the safety apparatus 30 is made less likely to perform, compared to that when the target object is recognized outside the danger area. For example, when the target object is recognized in the danger area, the stop/delay unit 41 may be configured to perform operation-stop or operation-delay of the safety apparatus 30 immediately thereafter. Meanwhile, when the target object is recognized in the detection area outside the danger area, the stop/delay unit 41 may be configured to perform operation-stop or operation-delay of the safety apparatus 30 after the elapse of a predetermined amount of time from the detection of the target object.

Alternatively, when the target object is recognized in the danger area, a threshold may be changed in a direction in which the execution condition for operation-stop or the execution condition for operation-delay of the safety apparatus 30 becomes stricter, compared to that when the target object is recognized outside the danger area. Specifically, when the target object is recognized in the danger area, the threshold X that corresponds to the steering angle for determining that the steering operation by the driver is being performed may be increased from that when the target object is recognized outside the danger area. As a result, operation-stop or operation-delay may be made less likely to perform.

Alternatively, when the target object is recognized in the danger area, the stop/delay unit 41 may adjust processing content of stop or operation-suppression such that the safety apparatus 30 can be more easily operated, compared to that when the target object is detected outside the danger area. For example, the stop/delay unit 41 may be configured to perform operation-stop when the target object is detected in the danger area, and perform operation-delay when the target object is detected outside the danger area.

In addition, for example, the stop/delay unit 41 may be configured to set a delay amount (degree of delay) of the operation timing when the target object is recognized in the danger area to be less than the delay amount of the operation timing when the target object is recognized in the detection area outside the danger area.

Specifically, for example, the delay amount corresponds to L–L1 that is a difference between the depth position L and the depth position L1 in FIGS. 2A and 2B. The configuration may be such that, when the target object is recognized in the danger area, the depth position L1 in FIG. 2B is set to a position that is farther than that when the target object is recognized outside the danger area, and the delay amount L–L1 is decreased.

The suppressing unit 42 suppresses execution of operation-stop or operation-delay by the stop/delay unit 41 in response to the target object that serves as the collision avoidance target being recognized by the object recognizing unit 11 in a path of the own vehicle after the steering operation by the driver.

Figure 2C:
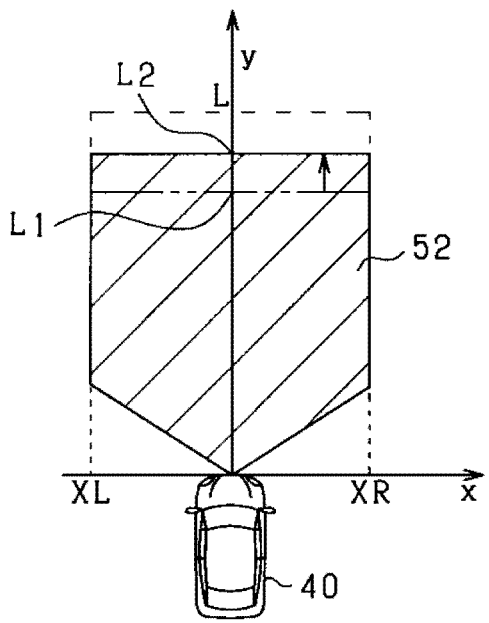
FIG. 2C is a conceptual diagram of a detection area when suppression of operation delay is performed.

When a description is given using a case in which the stop/delay unit 41 performs operation-delay as an example, the suppressing unit 42 re-corrects the depth position L1 shown in FIG. 2B towards a side farther from the own vehicle (that is, the depth position L side) and sets a depth position L2, as shown in FIG. 2C. The depth position L2 is set to a value between L1<L2≤L. That is, the suppression of operation-delay by the suppressing unit 42 includes dismissal of the process for operation-delay by the stop/delay unit 41 and return of the depth of the detection area to the depth position L. In relation to the delay amount L–L1, a delay suppression amount (amount of suppression of the delay amount by the suppressing unit 42) is L2–L1.

As a result of the depth position L1 being re-corrected to the depth position L2 that is farther from the own vehicle in the suppressing unit 42, the safety apparatus 30 operates at an earlier timing. When the risk of collision is not reduced even by the driver performing the collision avoidance operation, the condition for operating the safety apparatus 30 is relaxed as a result of the delay in the operation timing by the stop/delay unit 41 being suppressed by the suppressing unit 42. Therefore, danger avoidance can be reliably performed. As a result of the suppressing unit 42, operation of the safety apparatus 30 being inappropriately inhibited by the steering operation by the driver can be suppressed.

As described above, the suppression of operation-delay by the suppressing unit 42 may be performed by the delay amount of the operation timing being decreased. Specifically, for example, the suppression of operation-delay by the suppressing unit 42 may be that in which the delay amount that is calculated by the stop/delay unit 41 is decreased or that in which the delay amount that is temporarily calculated by the stop/delay unit 41 is corrected so as to decrease.

Alternatively, the suppression of operation-delay by the suppressing unit 42 may be that in which the stop/delay unit 41 is obstructed from performing delay of the operation timing. Specifically, for example, when the stop/delay unit 41 performs operation-delay when the steering angle acquired from the steering sensor 25 exceeds the threshold X, the suppression of operation-delay by the suppressing unit 42 may be that in which execution of operation-delay is suppressed as a result of the threshold X being increased.

In addition, when suppressing operation-stop that is performed by the stop/delay unit 41, the suppressing unit 42 may be configured to dismiss the operation-stop process that is performed. Alternatively, the suppressing unit 41 may be configured to increase a likelihood that the safety apparatus 30 is operated by replacing operation-stop with operation-delay.

The suppression of operation-stop or operation-delay of the safety apparatus 30 by the suppressing unit 42 may be performed immediately after the target object that serves as the collision avoidance target is recognized by the object recognizing unit 11 in the path of the own vehicle after the steering operation of the driver. For example, when, after the driver performs the steering operation to avoid a collision with a first target object in the path of the own vehicle before the steering operation, a second target object is detected in the path of the own vehicle after the steering operation, the safety apparatus 30 can be appropriately operated by the suppression of operation-stop or operation-delay being performed. Traveling assistance that prioritizes collision avoidance can be actualized.

In addition, the suppression of operation-stop or operation-delay of the safety apparatus 30 by the suppressing unit 42 may be performed in response to, after a predetermined amount of time has elapsed from the steering operation by the driver, the object recognizing unit 11 recognizing the target object that serves as the collision avoidance target in the path of the own vehicle after the steering operation by the driver.

After the steering operation is performed and the predetermined amount of time has elapsed, the suppression of operation-stop or operation-delay is performed. As a result, for example, immediately after the driver performs the steering operation to avoid a collision with a target object which was in the path of the own vehicle before the steering operation, the same target object can be prevented from being detected, thereby being able to prevent the suppression of operation-stop or operation-delay from being performed.

In addition, after the steering operation by the driver is performed and the predetermined amount of time has elapsed, the suppression of operation-stop or operation-delay is performed. As a result, for example, immediately after a collision with a target object is avoided, the same target object can be prevented from being detected, thereby being able to prevent the suppression of operation-stop or operation-delay from being performed. Meanwhile, when the same target object is steered in the same direction as the steering direction of the own vehicle and detected in the path of the own vehicle, the safety apparatus 30 can be appropriately operated by the suppression of operation-stop or operation-delay being performed. Traveling assistance that prioritizes collision avoidance can be implemented.

Furthermore, the suppressing unit 42 may identify the target object and change a condition for performing the suppression of operation-stop or operation-delay of the safety apparatus 30.

For example, after the driver performs the steering operation to avoid a collision with a first target object in the path of the own vehicle before the steering operation, if a target object that is detected in the path of the own vehicle after the steering operation is a second target object, the suppressing unit 42 may immediately perform the suppression of operation-stop or operation-delay. When the target object that is detected in the path of the own vehicle after the steering operation is the first target object, the suppressing unit 42 may perform the suppression of operation-stop or operation-delay in response to the predetermined amount of time having elapsed from when the steering operation by the driver is performed.

The first target object being detected immediately after the steering operation by the driver, and the safety apparatus 30 being unnecessarily operated, can be prevented. In addition, the safety apparatus 30 can be reliably operated in cases in which the risk of a collision with the first target object is not reduced even by the steering operation by the driver, the second target object newly appears, and the like.

The suppressing unit 42 may be configured to maintain the suppression of operation-stop or operation-delay during a period from when the suppression of operation-stop or operation-delay is performed until a predetermined amount of time has elapsed. Alternatively, the suppressing unit 42 may be configured to maintain the suppression of operation-stop or operation-delay during a period from when the suppression of operation-stop or operation-delay is performed until the collision with the target object is avoided. As a result of such a configuration, the operation of the safety apparatus 30 being delayed in cases in which the risk of collision cannot be sufficiently reduced even by the steering operation by the driver can be prevented with further certainty.

The operation determining unit 14 determines whether to operate the safety apparatus 30 based on a predicted time to collision (time-to-collision: TTC) that is an amount of time until the own vehicle and the object collide, and the operation timing. Here, when the stop/delay unit 41 performs operation-stop of the safety apparatus 30, the operation determining unit 14 determines that the safety apparatus 30 is not operated.

In addition, the operation determining unit 14 calculates the predicted time to collision by dividing the vertical distance between the object and the own vehicle by the relative speed. Here, in addition to the relative speed, through use of relative acceleration, the predicted time to collision may be calculated under an assumption that the own vehicle and the object become closer by uniformly accelerated linear motion.

When the object is in the operation areas 50 to 52, that is, when the predicted time to collision is determined to have reached the operation timing, the operation determining unit 14 outputs a signal indicating the determination result to the control processing unit 15. When the operation determining unit 14 inputs that the predicted time to collision has reached the operation timing, the control processing unit 15 transmits a control command to the warning apparatus 31 or the brake apparatus 32.

The safety apparatus 30 is operated based on the control command. A warning to the driver by the warning apparatus 31, brake control by the brake apparatus 32, operation of the pretensioner mechanism by the seatbelt apparatus 33, and the like are performed.

Here, in the description above, the operation areas 50 to 52 are described as substantially pentagonal areas that extend ahead of the own vehicle 40, as shown in FIGS. 2A to 2C. However, this is not limited thereto. The operation area may be set to the side or to the rear of the own vehicle 40. In addition, the operation-delay process by the stop/delay unit 41 and the suppression process for operation-delay by the suppressing unit 42 are described using a case in which the depth position of the operation areas 50 to 52 is changed, as an example. However, this is not limited thereto.

For example, the operation-delay process by the stop/delay unit 41 is merely required to be that which sets an outer edge of the operation area 50 closer to the own vehicle 40. In addition, for example, the suppressing process performed by the suppressing unit 42 may be a process that sets the outer edge of the operation area 50 closer to the own vehicle 40, and sets the outer edge of the operation area 50 that is set closer by the stop/delay unit 41 farther from the own vehicle 40.

For example, operation-delay by the stop/delay unit 41 may be that which sets the positions of XL and XR in FIGS. 2A to 2C closer to the own vehicle 40. The suppression of operation-delay by the suppressing unit 42 may be that which sets the positions of XL and XR that are set closer by the stop/delay unit 41 to be farther from the own vehicle 40.

Next, processing steps of driving assistance control performed by the ECU 10 according to the present embodiment are described with reference to a flowchart in FIG. 3, giving as an example a case in which the stop/delay unit 41 performs operation-delay. This process is performed for each object that is present ahead in the advancing direction of the own vehicle, at each predetermined control cycle.

Hereafter, the description is given using as an example a case in which, when operation-delay by the stop/delay unit 41 is performed, a correction condition is set to ON and the operation timing is set to the delay timing TC2. When the suppression of operation-delay is performed by the suppressing unit 42, operation-delay that is performed is dismissed, the correction condition is set to OFF, and the operation timing is set to the reference timing TC1.

At step S101, the ECU 10 performs object recognition using the detection information (first detection information) regarding an object from the radar apparatus 21 and the detection information (second detection information) regarding an object from the imaging apparatus 22.

At step S102, the ECU 10 calculates the predicted time to collision for each of the recognized target objects and proceeds to step S103.

At step S103, the ECU 10 acquires the reference timing TC1 at which to operate the safety apparatus 30. The reference timing TC1 is a value that is prescribed in advance based on the type of object and is acquired by being read from the memory of the ECU 10. Next, at step S104, the ECU 10 acquires the steering information from the steering sensor 25 and proceeds to step S105.

At step S105, the ECU 10 determines whether a condition regarding the steering operation (collision avoidance operation) has changed from OFF to ON based on the acquired steering information. Here, the ECU 10 determines whether a collision with the object can be avoided by the steering operation, based on: whether the steering angle exceeds the threshold X; and which of left and right directions the steering operation is performed in.

At step S105, the ECU 10 also acquires the position and the relative speed of the target object. The ECU 10 determines whether the steering operation is an operation for avoiding the target object based the acquired position and relative speed.

For example, in a case in which the target object is present ahead on the right and moving in a leftward direction, when the steering operation is in the leftward direction, the steering operation is not an operation for avoiding a collision with the object. When the steering operation is in a rightward direction, the steering operation is an operation for avoiding a collision with the object.

In addition, in a case in which the object is present ahead on the right and moving in the rightward direction, when the steering operation is in the leftward direction, the steering operation is an operation for avoiding a collision with the object. When the steering operation is in the rightward direction, the steering operation is not an operation for avoiding a collision with the object. This similarly applies to cases in which the object is present ahead on the left.

When the condition regarding the steering operation changes from OFF to ON (YES at S105), the ECU 10 proceeds to step S106 and sets the correction condition to ON. This process corresponds to a process for performing operation-delay. Then, the ECU 10 proceeds to step S107 and sets a counter T to T=1.

When the steering information is not that in which the condition regarding the steering operation changes from OFF to ON (NO at S105), the ECU 10 proceeds to step S108. Specifically, for example, a case in which the condition regarding the steering operation remains in the ON state, a case in which the condition regarding the steering operation remains in the OFF state, or a case in which the condition regarding the steering operation changes from ON to OFF corresponds to a case in which the condition regarding the steering operation does not change from OFF to ON.

At step S108, the ECU 10 determines whether a value of the counter T is not zero and is a value that is less than an upper limit value Tmax. When the value of the counter T is zero or the value of the counter T is the upper limit value Tmax (NO at S108), the ECU 10 proceeds to step S118. After setting the correction condition to OFF, the ECU 10 proceeds to step S119. At step S119, the ECU 10 resets the value of the counter T and sets the value to zero. Subsequently, the ECU 10 proceeds to step S120.

When the value of the counter T is not zero and is a value that is less than the upper limit value Tmax (YES at S108), the ECU 10 proceeds to step S110. At step S110, the ECU 10 determines whether not the target object is present in the path of the own vehicle. When an affirmative determination is made at step S105 in a previous control cycle, the value of the counter T is 1. Therefore, the process at S110 is performed and whether the target object is present in the path of the own vehicle after the steering operation is determined. When the driver performs the steering operation to avoid a collision with the target object, the affirmative determination is made at step S105 in the previous control cycle. Therefore, the process at step S110 is performed.

At step S110, the ECU 10 determines whether the target object is detected in the path of the own vehicle. More specifically, the ECU 10 determines whether the target object is detected in the detection area that is set along the course of the own vehicle. At step S110, whether the target object is detected in the detection area that is set along the course after the steering operation is determined.

At step S110, when the target object is detected in the path of the own vehicle, the ECU 10 proceeds to step S111 and sets the correction condition to OFF. This process corresponds to the process for suppressing operation-delay that is performed. Here, in the present flow, a case in which the correction value is set to zero is given as an example. However, instead of the correction condition being set to OFF, the delay amount of the operation timing may be decreased and the safety apparatus 30 may be made easier to operate. At step S111, after setting the correction condition to OFF, the ECU 10 proceeds to a correction step S112. After resetting the value of the counter T and setting the value to zero at step S112, the ECU 10 proceeds to step S120.

As a result of the processes at step S110 to step S112, in cases in which the target object of collision avoidance is present even when the steering operation is performed, operation-delay can be suppressed and collision avoidance can be reliably performed. For example, when a new target object other than the target object to be avoided by the driver is detected in the path of the own vehicle after the steering operation by the driver, operation-delay is promptly suppressed and the operation timing of the safety apparatus 30 is set to the reference timing TC1. Therefore, collision avoidance control that is appropriate for the new target object can be performed.

At step S110, when determined that the target object is not detected in the path of the own vehicle, the ECU 10 proceeds to step S116. After setting the correction condition to ON, the ECU 10 proceeds to step S117. This process corresponds to a process in which operation-delay that is performed is not suppressed but maintained. At step S117, the ECU 10 sets the value of the counter T to T+1 and proceeds to step S120.

When the target object is not detected in the path of the own vehicle after the steering operation by the driver, as a result of the processes at steps S110, S116, and S117, the suppression of operation-delay is not performed and the correction condition is maintained in the ON state. That is, when a state in which the target object for collision avoidance is not detected is achieved as a result of the steering operation of the driver, the operation timing of the safety apparatus 30 is maintained at the delay timing TC2. Operability and comfort can be ensured for the driver.

At step S120, the ECU 10 performs calculation of the operation timing based on ON/OFF states of the correction condition. When the correction condition is set to ON, a correction timing that serves as the operation timing is calculated by a correction value being subtracted from the reference timing TC1. In the present flow, the operation timing is the delay timing TC2 when the correction condition is set to ON. The operation timing is the reference timing TC1 when the correction condition is set to OFF.

After calculating the operation timing at step S120, the ECU 10 proceeds to step S121. At step S121, the ECU 10 compares the predicted time to collision and the operation timing. When the predicted time to collision is equal to or less than the operation timing (YES at S121), the ECU 10 proceeds to step S122. After transmitting a signal to operate the safety apparatus 30, the ECU 10 ends the series of processes. Meanwhile, when the predicted time to collision exceeds the operation timing (NO at S121), the ECU 10 ends the series of processes without operating the safety apparatus 30.

Figure 3:
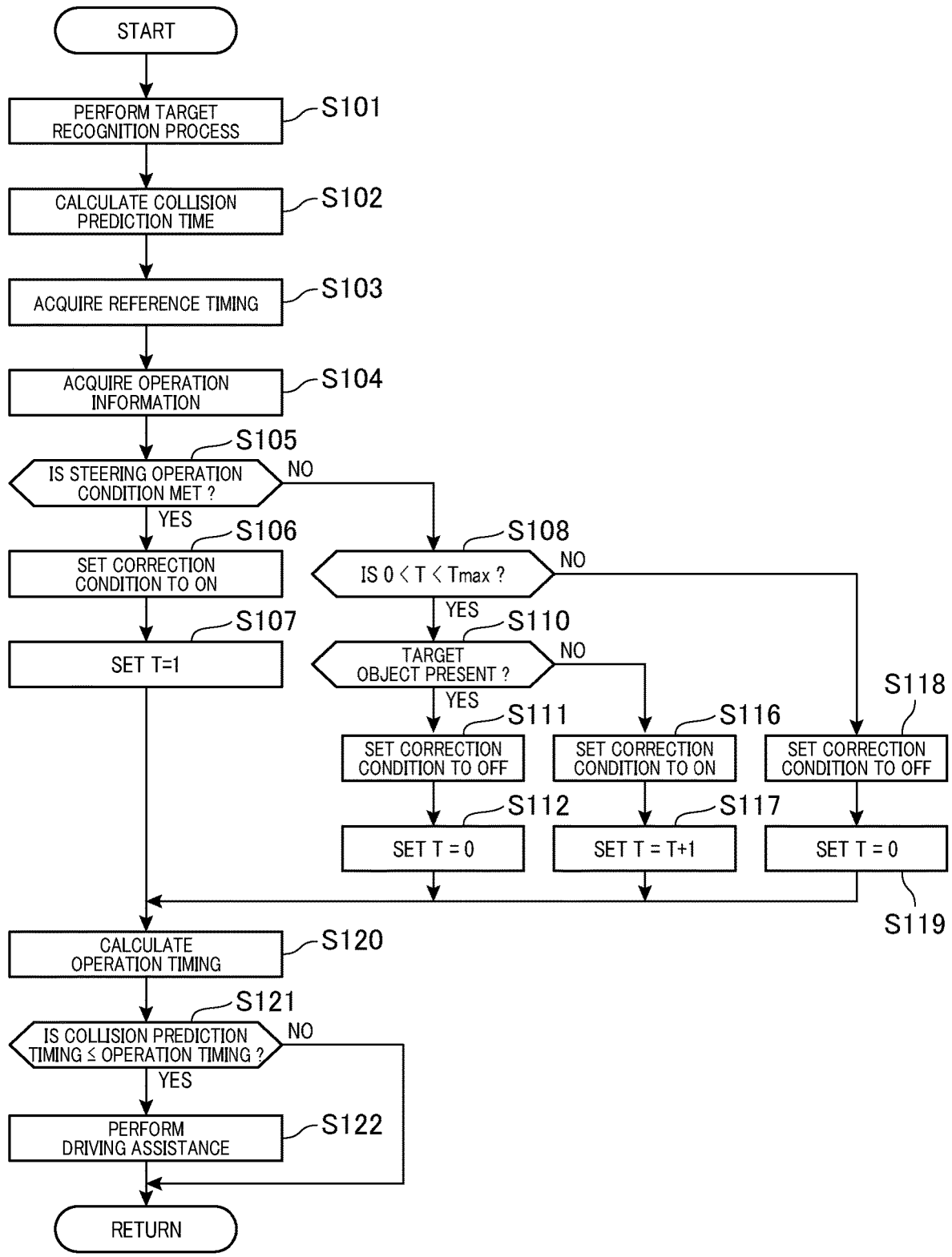
FIG. 3 is a flowchart of a collision avoidance process according to a first embodiment.

The operation timing when the process shown in FIG. 3 is performed will be described with reference to the explanatory diagrams shown in FIGS. 4A and 4B and a timing chart shown in FIG. 5. In FIG. 5, a horizontal axis indicates time t. A vertical axis indicates, in order from the top, presence/absence of target object detection, execution/non-execution of steering operation, ON/OFF of correction condition, and operation timing.

Figure 4A:
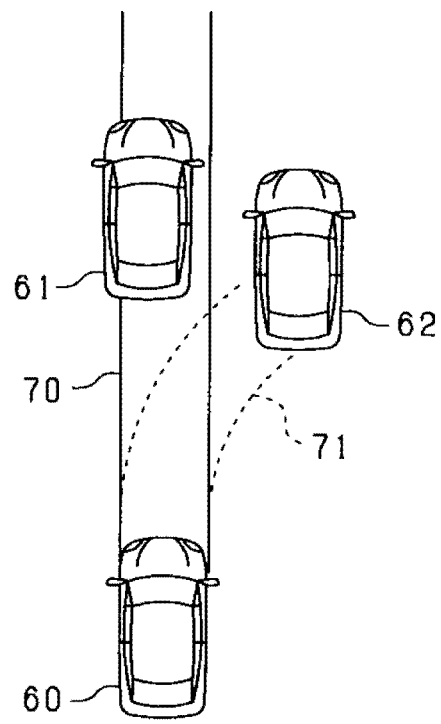
FIG. 4A is a diagram of a predicted course of an own vehicle before a steering operation by a driver according to the first embodiment.
Figure 5:
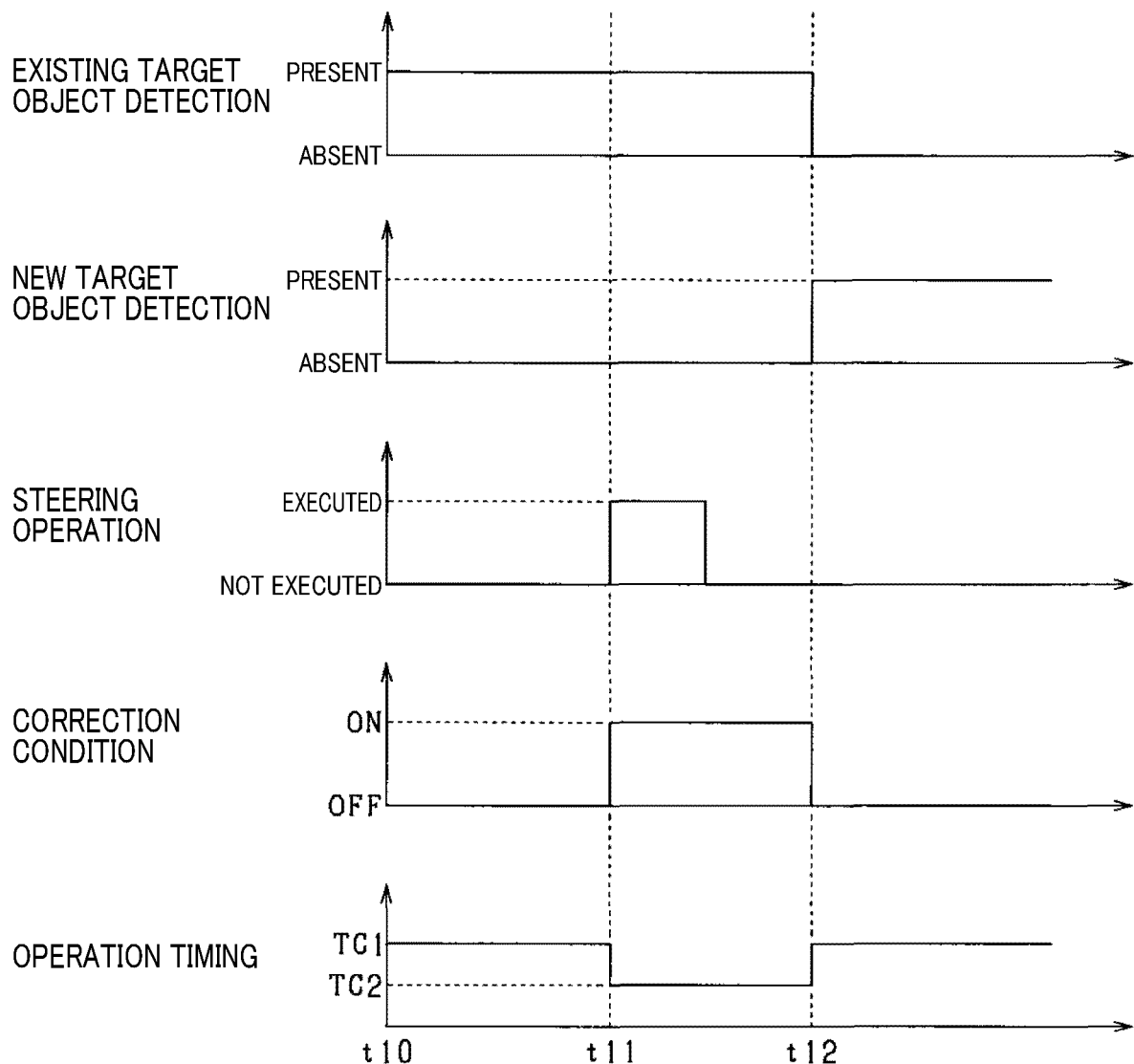
FIG. 5 is a timing chart of the collision avoidance process according to the first embodiment.

As shown in FIG. 4A, at time t10, when a leading vehicle 61 that is the first target object moves in the rightward direction and enters the detection area that is set along a course 70 of an own vehicle 60, the ECU 10 recognizes the leading vehicle 61. Then, as shown in FIG. 5, as a result of the leading vehicle 61 being detected as the target object, the operation timing is set to the reference timing TC1. Here, a leading vehicle 62 is positioned outside the detection area that is set along the course 70.

At time t11, the driver performs the steering operation in the rightward direction to avoid a collision with the leading vehicle 61. Then, as shown in FIG. 4A, the course of the own vehicle 60 is changed from the course 70 that is indicated by solid lines to a course 71 that is indicated by broken lines. The steering operation is detected by the steering sensor 25, and the steering operation is determined to be performed. Then, operation-delay is performed and the operation timing is set to the delay timing TC2. That is, the safety apparatus 30 is made less likely to operate than normal.

Figure 4B:
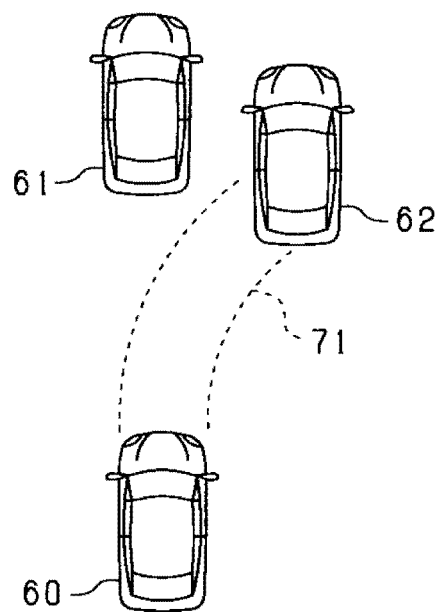
FIG. 4B is a diagram of a predicted course of the own vehicle after the steering operation by the driver according to the first embodiment.

At time t12, as shown in FIG. 4B, when the leading vehicle 62 that is the second target object is detected in a detection area that is set along the course 71 of the own vehicle 60, the ECU 10 detects the leading vehicle 62 as the target object. As a result of the leading vehicle 62 being detected as the target object, as shown in FIG. 5, the suppression of operation-delay is performed. The operation timing is set to the reference timing TC1. That is, the safety apparatus 30 is more easily operated (returns to a normal state).

Second Embodiment

Figure 6:
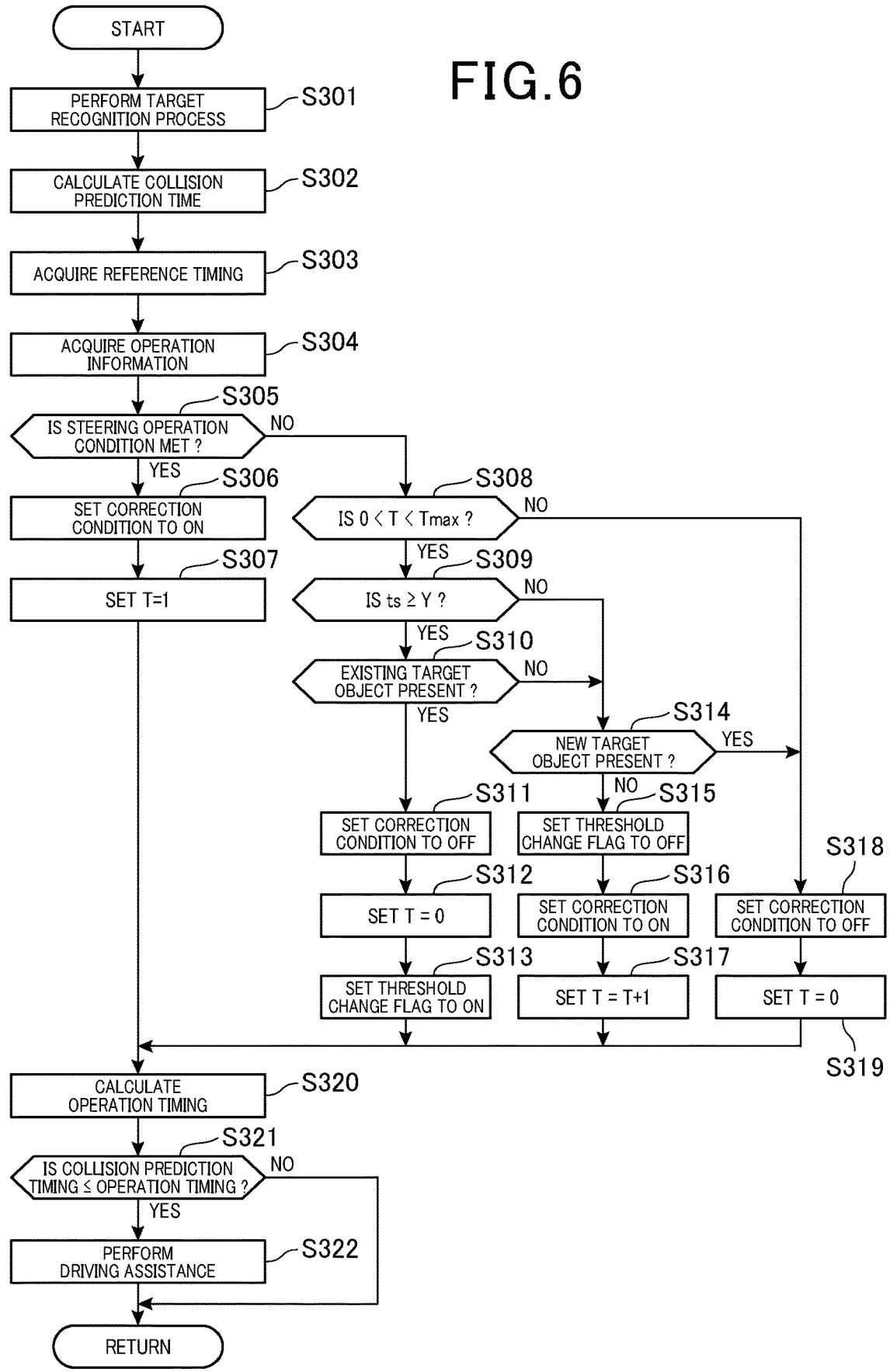
FIG. 6 is a flowchart of a collision avoidance process according to a second embodiment.

Processing steps of driving assistance control performed by the ECU 10 according to a second embodiment will be described with reference to a flowchart in FIG. 6. The process is performed for each object that is present head in the advancing direction of the own vehicle, at each predetermined control cycle. The process shown in FIG. 6 differs from the process shown in FIG. 3 in that the correction condition is changed based on whether the target object that is detected in the path of the own vehicle after the steering operation is a same vehicle as that before the steering operation. Here, the processes at step S301 to step S307, and step S320 to step S322 in FIG. 6 are similar to the processes at step S101 to step S107, and step S120 to step S122 in FIG. 3. Therefore, descriptions are omitted, with reference numbers in the S100s being read as corresponding reference numbers in the S300s.

According to the present embodiment, when the operation information is not that in which the condition regarding the steering operation changes from OFF to ON (NO at S305), the ECU 10 proceeds to step S308. Specifically, for example, a case in which the condition regarding the steering operation remains in the ON state, a case in which the condition regarding the steering operation remains in the OFF state, or a case in which the condition regarding the steering operation changes from ON to OFF corresponds to a case in which the condition regarding the steering operation does not change from OFF to ON.

At step S308, in a manner similar to that at S108, the ECU 10 determines whether the value of the counter T is not zero and is a value that is less than the upper limit value Tmax. When the value of the counter T is zero or the value of the counter T is the upper limit value Tmax (NO at S308), the ECU 10 proceeds to step S318 and eventually to step S322. When the value of the counter T is not zero and is a value that is less than the upper limit value Tmax (YES at S308), the ECU 10 proceeds to step S309.

At step S309, the ECU 10 determines whether a predetermined amount of time has elapsed from the steering operation by the driver. Specifically, at step S309, the ECU 10 determines whether an elapsed time ts from the steering operation by the driver is equal to or greater than a predetermined value Y. When ts≥Y, the ECU 10 proceeds to step S310. When ts<Y, the ECU 10 proceeds to step S314.

At step S310, the ECU 10 determines whether a target object (referred to, hereafter, as an existing target object) that is the same as that recognized as the avoidance target before the steering operation is present in the path of the own vehicle. As a result of this process, whether the existing target object is present in the path of the own vehicle after the steering operation is determined. When the existing target object is not detected in the path of the own vehicle at step S310, the ECU 10 proceeds to step S314.

When the existing target object is detected in the path of the own vehicle at step S310, the ECU 10 proceeds to step S311 and relaxes the correction value. In the process for relaxing the correction value, the correction value may be decreased or set to zero. In the present flow, the description will be given using a case in which the correction value is set to zero as an example. That is, after setting the correction condition to OFF at step S311, the ECU 10 resets the value of the counter T and sets the value to zero at step S312. Subsequently, the ECU 10 proceeds to step S313.

At step S313, the ECU 10 changes the threshold X for determining whether the condition regarding the steering operation (collision avoidance operation) is changed from OFF to ON at step S305. At step S305, in a manner similar to that at step S105, whether the collision with the object can be avoided by the steering operation is determined based on whether the steering angle acquired from the steering sensor 25 exceeds the threshold X.

At step S313, the ECU 10 sets a flag for changing the threshold X to ON. When a threshold change flag is in the ON state, the threshold X is set to a large value in the direction of the steering operation by the driver. That is, the condition regarding the steering operation at step S305 is less easily met. The affirmative determination is less easily made at step S305. The operation-delay process at step S306 is made less likely to perform. Regarding the change in the threshold X, the change is preferably made regarding the direction of the steering operation by the driver towards a side on which the target object is present. That is, the threshold X of the steering angle is preferably changed in an increasing manner (so that the delay in operation timing is not easily performed) regarding the direction steering towards the side on which the target object is present.

At step S309, as a result of the process at step S310 not being performed during a period from when the steering operation by the driver is performed until the elapse of the predetermined amount of time (until ts≥Y is reached), the existing target object being detected immediately after the steering operation of the driver and the correction condition being set to OFF can be suppressed. The existing target object being detected in the process of course change and the suppression process for operation-delay being performed, in a state in which a prediction can be made that a collision with the existing target object can be avoided when the change in course by the steering operation by the driver is completed, can be prevented.

In addition, when avoidance of a collision with the existing target object is insufficient even after the elapse of the predetermined amount of time from the steering operation by the driver, as a result of the threshold X being increased so that operation-delay is not easily performed and execution of the operation-delay process being suppressed by step S313, as well, traveling assistance that prioritizes collision avoidance can be actualized.

At step S314, the ECU 10 determines whether a target object (referred to, hereafter, as a new target object) other than that recognized as the avoidance target before the steering operation is present in the path of the own vehicle. As a result of this process, whether a new target object is present in the path of the own vehicle after the steering operation is determined.

When the new target object is detected in the path of the own vehicle at step S314, the ECU 10 proceeds to step S318 to step S319. That is, the ECU 10 sets the correction condition to OFF, and resets the value of the counter T to zero. Subsequently, the ECU 10 proceeds to step S320.

As a result of the processes at steps S314, S318, and S319, when the new target object is detected in the path of the own vehicle after the steering operation by the driver, operation-delay can be promptly suppressed. Collision avoidance control that is appropriate for the new target object can be performed. Here, a process similar to that at step S313 may be performed after step S309. As a result of the threshold X being increased and execution of operation-delay being suppressed at step S313, traveling assistance that prioritizes collision avoidance can be actualized until the likelihood of a collision with the new target object sufficiently decreases.

When a new target object is not detected in the path of the own vehicle at step S314, the ECU 10 proceeds to step S315. After setting the threshold change flag to OFF, the ECU 10 proceeds to steps S316 and S317. At steps S316 and S317, the ECU 10 sets the correction condition to ON and sets the value of the counter T to T+1. Subsequently, the ECU 10 proceeds to step S320.

As a result of the process at step S315, when a state in which the target object for collision avoidance is not detected is achieved by the steering operation by the driver, the risk of collision is considered sufficiently avoided, and the threshold change flag is set to OFF. As a result, the execution condition for operation-delay of the safety apparatus 30 is relaxed. Operability and comfort can be ensured for the driver. Here, the process for setting the threshold change flag to OFF may be performed after a predetermined amount of time has elapsed from the process at step S313.

The operation timing when the process shown in FIG. 6 is performed will be described with reference to the explanatory diagrams shown in FIGS. 7A and 7B and a timing chart shown in FIG. 8. In FIG. 8, the horizontal axis indicates time t. The vertical axis indicates, in order from the top, presence/absence of an existing target object detection, presence/ absence of a new target object detection, execution/non-execution of steering operation, ON/OFF of correction condition, ON/OFF of threshold change flag, and operation timing.

Figure 7A:
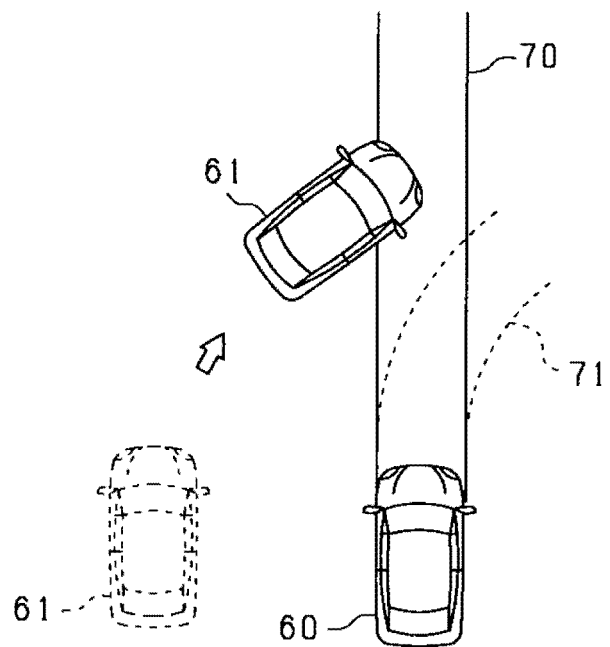
FIG. 7A is a diagram of a predicted course of the own vehicle before the steering operation by the driver according to the second embodiment.
Figure 7B:
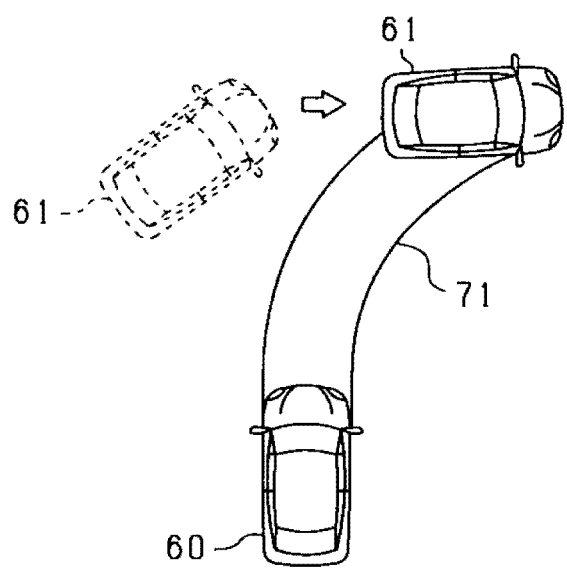
FIG. 7B is a diagram of a predicted course of the own vehicle after the steering operation by the driver according to the second embodiment.

As shown in FIG. 7A, at time t20, when the leading vehicle 61 moves in the rightward direction and enters the detection area that is set along the course 70 of the own vehicle 60, the ECU 10 recognizes the leading vehicle 61. Then, as shown in FIG. 8, as a result of the leading vehicle 61 being detected as the target object, the operation timing is set to the reference timing TC1.

At time t21, the driver performs the steering operation in the rightward direction to avoid a collision with the leading vehicle 61. Then, as shown in FIG. 7A, the course of the own vehicle 60 is changed from the course 70 that is indicated by solid lines to the course 71 that is indicated by broken lines. The steering operation is detected by the steering sensor 25, and the steering operation is determined to be performed. Then, operation-delay is performed and the operation timing is set to the delay timing TC2. The leading vehicle 61 is detected during the period from time t21 to time t22. However, because the predetermined amount of time has not elapsed from the steering operation by the driver, the correction condition is maintained in the ON state and the safety apparatus 30 is made less likely to operate than normal.

At time t22, upon elapse of a predetermined time, as a result of the leading vehicle 61 being detected as the target object, as shown in FIG. 8, the suppression of operation-delay is performed. The operation timing is set to the reference timing TC1. For example, as shown in FIG. 7B, when the leading vehicle 61 is steered in the same direction as the steering direction of the own vehicle 60 by the driver and enters the detection area that is set along the course 71 of the own vehicle 60, the suppression of operation-delay is performed and the safety apparatus 30 is more easily operated (returns to a normal state).

At time t23, the leading vehicle 61 is no longer detected as the target object. When a new target object is detected after the collision with the existing target object is avoided, as shown in FIG. 8, the suppression of operation-delay is performed. For example, the operation timing is set to the reference timing TC1.

OTHER EMBODIMENTS

Figure 9:
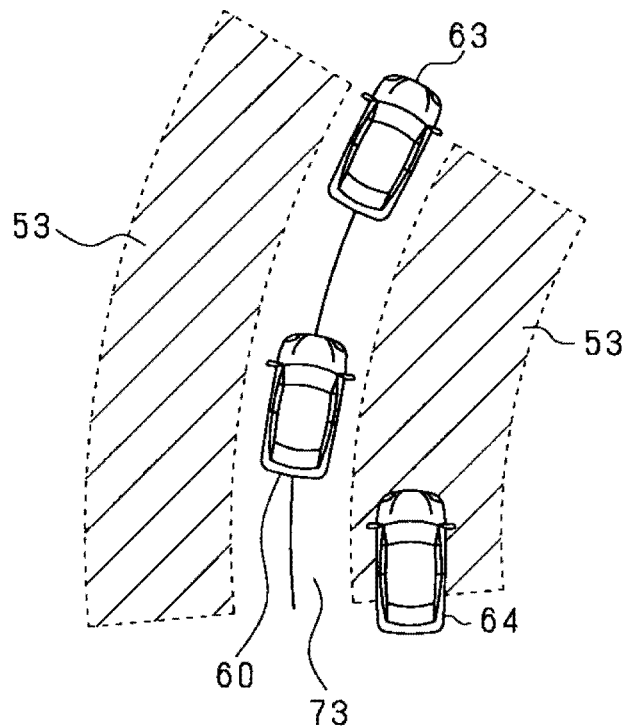
FIG. 9 is a schematic diagram of a danger area.

According to the above-described first or second embodiment, the object recognizing unit 11 may set the danger area in at least a predetermined area that includes an area to the side of the own vehicle. For example, as shown in FIG. 9, a danger area 53 can be set as a predetermined area that extends frontward or rearward along a course 73 of the own vehicle 60, to the side of the own vehicle 60.

Figure 10:
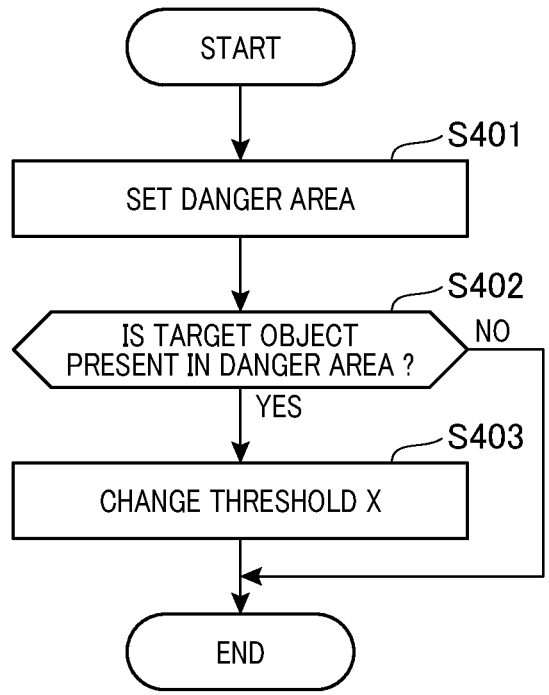
FIG. 10 is a flowchart of a danger area setting process.

When setting of the danger area is performed, a process shown in FIG. 10 is performed between step S104 and step S105 shown in FIG. 3 or between step S304 and step S305 shown in FIG. 6.

As shown in FIG. 10, first, at step S401, the ECU 10 sets the danger area. Next, at step S402, the ECU 10 determines whether a target object is detected in the danger area. When the target object is detected in the danger area at step S402, the ECU 10 proceeds to step S403 and changes the threshold X for determining execution/non-execution of the steering operation. That is, the threshold X is increased so that an affirmative determination is not easily made in the determination regarding the steering operation at step S105 or step S305. Regarding the change in the threshold X, the change is preferably made regarding the direction of the steering operation by the driver towards the side on which the target object is present. That is, the threshold X of the steering angle is preferably changed in an increasing manner (so that the delay in operation timing is not easily performed) regarding the direction steering towards the side on which the target object is present.

When the target object is detected outside the danger area at step S402, the ECU 10 does not perform step S403 and ends the process. As a result of the process shown in FIG. 10 being performed, when the target object is recognized in the danger area, operation-delay can be made less likely to be performed compared to when the target object is detected outside the danger area. Execution of operation-delay can be more appropriately selected.

As a result of the above-described configuration, a travelling assistance apparatus according to the present embodiment achieves the following effects.

The ECU 10 performs operation-stop or operation-delay of the safety apparatus 30 by the stop/delay unit 41, in response to the steering operation by the driver for collision avoidance of the own vehicle being performed. Therefore, unnecessary operation of the safety apparatus 30 can be prevented.

Furthermore, when the target object that serves as the collision avoidance target is recognized by the object recognizing unit 11 in the path of the own vehicle after the steering operation by the driver, the suppressing unit 42 suppresses execution of operation-stop or operation-delay of the safety apparatus 30 by the stop-delay unit 41. Therefore, when the risk of collision is not reduced even by the driver performing the collision avoidance operation, the safety apparatus 30 can be appropriately operated.

As a result of the ECU 10, whereas operation of the safety apparatus 30 can be suppressed when a collision can be avoided by the steering operation by the driver, the safety apparatus 30 can be operated when the collision cannot be avoided even by the steering operation. Consequently, higher collision safety can be ensured while taking into consideration operability and comfort for the driver.

The suppressing unit 42 performs suppression of operation-stop or operation-delay of the safety apparatus 30 in response to the target object that serves as the collision avoidance target being recognized by the object recognizing unit 11 in the path of the own vehicle after the steering operation by the driver, after a predetermined amount of time has elapsed from the steering operation by the driver.

For example, the suppression of operation-delay is performed regarding the detected target object in response to the elapsed time is from the steering operation by the driver being equal to or greater than the predetermined value Y. As a result of operation-stop or operation-delay of the safety apparatus 30 being suppressed after the elapse of the predetermined amount of time from the steering operation by the driver, for example, a target object being detected immediately after the driver performs the steering operation to avoid a collision with the same target object in the path of the own vehicle before the steering operation, and operation-stop or operation-delay of the safety apparatus 30 being suppressed can be prevented.

In addition, as a result of the suppression of operation-stop or operation-delay being performed after the elapse of the predetermined amount of time from the steering operation by the driver, for example, when the same target object is steered in the same direction as the steering direction of the own vehicle and is detected in the path of the own vehicle, operation-delay can be suppressed, the delayed operation timing can be hastened, and traveling assistance that prioritizes collision avoidance can be actualized.

The suppressing unit 42 may be configured to maintain the suppression of operation-stop or operation-delay of the safety apparatus 30 during a period from when the suppression of operation-stop or operation-delay is performed until the elapse of a predetermined amount of time. Alternatively, the suppressing unit 42 may be configured to maintain the suppression of operation-stop or operation-delay during a period from when the suppression of operation-stop or operation-delay is performed until the collision with the target object is avoided. As a result of such a configuration, when the risk of collision is not reduced even by the steering operation by the driver, the operation of the safety apparatus 30 being stopped or delayed can be prevented with further certainty.

The object recognizing unit 11 sets a predetermined area in the periphery of the own vehicle as the detection area and performs object recognition regarding an object that is detected in the detection area. In addition, the object recognizing unit 11 is configured to be capable of setting a danger area in a predetermined area that includes at least an area to the side in the traveling direction of the own vehicle and recognizing whether the target object is detected in the danger area.

In addition, when the target object is recognized in the danger area, the stop/delay unit 41 is configured to make operation-stop or operation-delay of the safety apparatus 30 less likely to be performed compare to that when the target object is recognized outside the danger area. As a result of the danger area being set, execution of operation-stop or operation-delay of the safety apparatus 30 can be more appropriately selected.

Here, according to the above-described embodiments, a case in which a collision with a target object that is present head of the vehicle when the vehicle is advancing forward is avoided is described. However, a target object that is present to the rear of the vehicle may be detected when the vehicle is retreating. The present invention may thereby be applied to a system that avoids a collision with a target object that is present to the rear of the vehicle.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A traveling assistance apparatus that, based on detection information from an object detection apparatus that detects an object in a periphery of an own vehicle, controls a safety apparatus for avoiding a collision between the own vehicle and the object, the traveling assistance apparatus comprising:
an operation determining unit that calculates a predicted time to collision of a target object and the own vehicle, and operates the safety apparatus in response to the predicted time to collision being equal to or less than a predetermined operation timing;
a stop/delay unit that performs operation-stop in which operation of the safety apparatus is stopped or operation-delay in which the operation timing is delayed, in response to a steering operation by a driver for collision avoidance of the own vehicle being performed; and
a suppressing unit that suppresses the operation-stop or the operation-delay in response to the target object that serves as a collision avoidance target being recognized in a path of the own vehicle after the steering operation by the driver, based on the detection information.

2. The traveling assistance apparatus according to claim 1, wherein:
the suppressing unit suppresses execution of operation-stop or operation-delay in response to the target object that serves as a collision avoidance target being recognized in the path of the own vehicle after the steering operation by the driver, after a predetermined amount of time elapses from the steering operation by the driver.

3. The traveling assistance apparatus according to claim 1, wherein:
the suppressing unit continues the suppression of operation-stop or operation-delay during a period from when suppression of the operation-stop or suppression of the operation-delay is performed until a predetermined amount of time elapses.

4. The traveling assistance apparatus according to claim 1, wherein:
the suppressing unit continues the suppression of operation-stop or operation-delay during a period from when suppression of the operation-stop or suppression of the operation-delay is performed until a collision with the target object is avoided.

5. The traveling assistance apparatus according to claim 1, wherein:
when the target object is recognized in a danger area that is set in a predetermined area that includes at least an area to a side of the own vehicle, the stop/delay unit makes operation-stop or operation-delay less likely to be performed, compared to that when the target object is detected outside the danger area.

6. A traveling assistance apparatus that, based on detection information from an object detection apparatus that detects an object in a periphery of an own vehicle, controls a safety apparatus for avoiding a collision between the own vehicle and the object, the traveling assistance apparatus comprising:
an object recognizing unit that recognizes a target object that serves as a collision avoidance target in a path of the own vehicle, based on the detection information;
an operation determining unit that calculates a predicted time to collision of the target object and the own vehicle, and operates the safety apparatus in response to the predicted time to collision being equal to or less than a predetermined operation timing;
a stop/delay unit that performs operation-stop in which operation of the safety apparatus is stopped or operation-delay in which the operation timing is delayed, in response to a steering operation by a driver for collision avoidance of the own vehicle being performed; and
a suppressing unit that suppresses the operation-stop or the operation-delay in response to the target object that serves as a collision avoidance target being recognized by the object recognizing unit in a path of the own vehicle after the steering operation by the driver.

7. The traveling assistance apparatus according to claim 6, wherein:
the suppressing unit suppresses execution of operation-stop or operation-delay in response to the target object that serves as a collision avoidance target being recognized in the path of the own vehicle after the steering operation by the driver, after a predetermined amount of time elapses from the steering operation by the driver.

8. The traveling assistance apparatus according to claim 6, wherein:
the suppressing unit continues the suppression of operation-stop or operation-delay during a period from when suppression of the operation-stop or suppression of the operation-delay is performed until a predetermined amount of time elapses.

9. The traveling assistance apparatus according to claim 6, wherein:
the suppressing unit continues the suppression of operation-stop or operation-delay during a period from when suppression of the operation-stop or suppression of the operation-delay is performed until a collision with the target object is avoided.

10. The traveling assistance apparatus according to claim 6, wherein:
when the target object is recognized in a danger area that is set in a predetermined area that includes at least an area to a side of the own vehicle, the stop/delay unit makes operation-stop or operation-delay less likely to be performed, compared to that when the target object is detected outside the danger area.

11. A method for controlling a safety apparatus for avoiding a collision between an own vehicle and an object based on detection information from an object detection apparatus that detects the object in a periphery of the own vehicle, the method comprising:
recognizing a target object that serves as a collision avoidance target in a path of the own vehicle, based on the detection information;
calculating a predicted time to collision of the target object and the own vehicle, and operates the safety apparatus in response to the predicted time to collision being equal to or less than a predetermined operation timing;
performing operation-stop in which operation of the safety apparatus is stopped or operation-delay in which the operation timing is delayed, in response to a steering operation by a driver for collision avoidance of the own vehicle being performed; and
suppressing the operation-stop or the operation-delay in response to the target object that serves as a collision avoidance target being recognized in a path of the own vehicle after the steering operation by the driver.

12. The method according to claim 11, wherein:
execution of operation-stop or operation-delay is suppressed in response to the target object that serves as a collision avoidance target being recognized in the path of the own vehicle after the steering operation by the driver, after a predetermined amount of time elapses from the steering operation by the driver.

13. The method according to claim 11, wherein:
suppression of operation-stop or operation-delay continues during a period from when suppression of the operation-stop or suppression of the operation-delay is performed until a predetermined amount of time elapses.

14. The method according to claim 11, wherein:
suppression of operation-stop or operation-delay continues during a period from when suppression of the operation-stop or suppression of the operation-delay is performed until a collision with the target object is avoided.

15. The method according to claim 11, wherein:
for a state in which the target object is recognized in a danger area that is set in a predetermined area that includes at least an area to a side of the own vehicle, the stop/delay unit makes operation-stop or operation-delay less likely to be performed, compared to that when the target object is detected outside the danger area.

* * * * *